(12) United States Patent
Nakatani et al.

(10) Patent No.: US 11,713,691 B2
(45) Date of Patent: Aug. 1, 2023

(54) GAS TURBINE SYSTEM AND MOVING UNIT INCLUDING THE SAME

(71) Applicant: MITSUBISHI HEAVY INDUSTRIES, LTD., Tokyo (JP)

(72) Inventors: Yuichi Nakatani, Tokyo (JP); Yuki Morisaki, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 15 days.

(21) Appl. No.: 17/625,249

(22) PCT Filed: Feb. 13, 2020

(86) PCT No.: PCT/JP2020/005612
§ 371 (c)(1),
(2) Date: Jan. 6, 2022

(87) PCT Pub. No.: WO2021/009954
PCT Pub. Date: Jan. 21, 2021

(65) Prior Publication Data
US 2022/0268168 A1   Aug. 25, 2022

(30) Foreign Application Priority Data
Jul. 12, 2019  (JP) .................. 2019-130170

(51) Int. Cl.
*F01D 15/10*  (2006.01)
*B64D 41/00*  (2006.01)
(Continued)

(52) U.S. Cl.
CPC ............ *F01D 15/10* (2013.01); *B64D 41/00* (2013.01); *F02C 3/04* (2013.01); *F02C 6/00* (2013.01);
(Continued)

(58) Field of Classification Search
CPC .......... F01D 15/10; F01D 9/04; B64D 41/00; B64D 27/02; F02C 3/04; F02C 6/00;
(Continued)

(56) References Cited

U.S. PATENT DOCUMENTS

2006/0254255 A1   11/2006  Okai et al.
2007/0095379 A1   5/2007  Taber et al.
(Continued)

FOREIGN PATENT DOCUMENTS

JP   11-200888   7/1999
JP   2006-205755   8/2006
(Continued)

OTHER PUBLICATIONS

International Search Report dated Apr. 28, 2020 in corresponding International (PCT) Application No. PCT/JP2020/005612, with English translation.

(Continued)

*Primary Examiner* — Loren C Edwards
(74) *Attorney, Agent, or Firm* — Wenderoth, Lind & Ponack, L.L.P.

(57) ABSTRACT

Provided is a gas turbine system that is used for a moving body including a thrust generator configured to generate thrust from electric power and includes: a compressor that compresses external air to generate compressed air; a combustor that burns the compressed air generated by the compressor together with fuel to generate a combustion gas; a turbine driven by the combustion gas generated by the combustor; a first generator that is coupled to the turbine to generate electric power by driving of the turbine and supplies electric power to the thrust generator; and a second generator that is arranged downstream of the turbine in a flow direction of a combustion gas and converts kinetic energy and/or thermal energy of a combustion gas that passed through the turbine into electric power.

3 Claims, 7 Drawing Sheets

(51) Int. Cl.
  *F02C 3/04* (2006.01)
  *F02C 6/00* (2006.01)
  *F02C 7/32* (2006.01)

(52) U.S. Cl.
  CPC .......... *F02C 7/32* (2013.01); *F05D 2220/323* (2013.01); *F05D 2220/76* (2013.01); *F05D 2240/35* (2013.01)

(58) Field of Classification Search
  CPC ........ F02C 6/20; F02C 7/32; F05D 2220/323; F05D 2220/76; F05D 2240/35; F05B 2220/706; F05B 1/40; F05B 1/42
  See application file for complete search history.

(56) References Cited

U.S. PATENT DOCUMENTS

| | | | |
|---|---|---|---|
| 2008/0143115 A1* | 6/2008 | Kern | ......................... F02C 7/32 290/52 |
| 2009/0000304 A1* | 1/2009 | Anderson | ............... F01D 25/28 415/173.1 |
| 2010/0034642 A1 | 2/2010 | Evulet | |
| 2012/0031067 A1* | 2/2012 | Sundaram | ................. F02C 6/18 60/39.01 |
| 2017/0145892 A1* | 5/2017 | Peck, Jr. | ............... F04D 29/522 |
| 2017/0298772 A1 | 10/2017 | Mook et al. | |
| 2018/0050806 A1* | 2/2018 | Kupiszewski | ......... B64D 27/12 |

FOREIGN PATENT DOCUMENTS

| | | |
|---|---|---|
| JP | 2008-64100 | 3/2008 |
| JP | 2009-293390 | 12/2009 |
| JP | 2012-39858 | 2/2012 |
| JP | 2017-194054 | 10/2017 |

OTHER PUBLICATIONS

Written Opinion of the International Searching Authority dated Apr. 28, 2020 in corresponding International (PCT) Application No. PCT/JP2020/005612, with English translation.

* cited by examiner

GAS TURBINE SYSTEM AND MOVING UNIT INCLUDING THE SAME

TECHNICAL FIELD

The present disclosure relates to a gas turbine system used for a moving body including a thrust generator that generates thrust from electric power and also relates to a moving body including such a gas turbine system.

BACKGROUND ART

Conventionally, gas turbine engines used for aircrafts and including a compressor unit, a combustor unit, a turbine unit, a rotator that rotates with the turbine unit, and a fan that rotates in response to motion of the rotator to generate thrust have been known (for example, see Patent Literature 1). The gas turbine engine disclosed in Patent Literature 1 is provided with a generator that rotates with a fan and thereby converts kinetic energy caused by rotation of the fan into electric power. The electric power generated by the generator is used for driving an electric fan or the like arranged at the rear end of an aircraft.

CITATION LIST

Patent Literature

[PTL 1]
U.S. Patent Application Publication No. 2018/0050806

SUMMARY OF INVENTION

Technical Problem

The gas turbine engine disclosed in Patent Literature 1 converts energy of a combustion gas generated by a combustor unit into electric power via the generator that rotates with the turbine unit. However, since a combustion gas that has passed through the turbine unit is directly discharged to outside, it is not possible to effectively utilize a part of kinetic energy and thermal energy of the combustion gas. In particular, when the gas turbine engine is not provided with a fan and thrust is generated by only the electric fan driven with electric power generated by the generator, a combustion gas discharged from the gas turbine engine is not used as thrust. Thus, a part of kinetic energy and/or thermal energy of the combustion gas may be wasted.

The present disclosure has been made in view of such circumstances, and an object is to, in a gas turbine system used for a moving body including a generator that generates electric power by driving of a turbine and a thrust generator that generates thrust from electric power, effectively utilize kinetic energy and/or thermal energy of a combustion gas used for the driving of the turbine.

Solution to Problem

To achieve the object described above, a gas turbine system according to one aspect of the present disclosure is used for a moving body including a thrust generator configured to generate thrust from electric power, and the gas turbine system includes: a compressor that compresses external air to generate compressed air; a combustor that burns the compressed air generated by the compressor together with fuel to generate a combustion gas; a turbine driven by the combustion gas generated by the combustor; a first generator that is coupled to the turbine to generate electric power by driving of the turbine and supplies electric power to the thrust generator; and at least one second generator that is arranged downstream of the turbine in a flow direction of a combustion gas and converts kinetic energy and/or thermal energy of a combustion gas that passed through the turbine into electric power.

Advantageous Effects of Invention

According to the present disclosure, in a gas turbine system used for a moving body including a generator that generates electric power by driving of a turbine and a thrust generator that generates thrust from electric power, kinetic energy and/or thermal energy of a combustion gas used for the driving of the turbine can be effectively utilized.

DESCRIPTION OF EMBODIMENTS

First Embodiment

Figure 1:
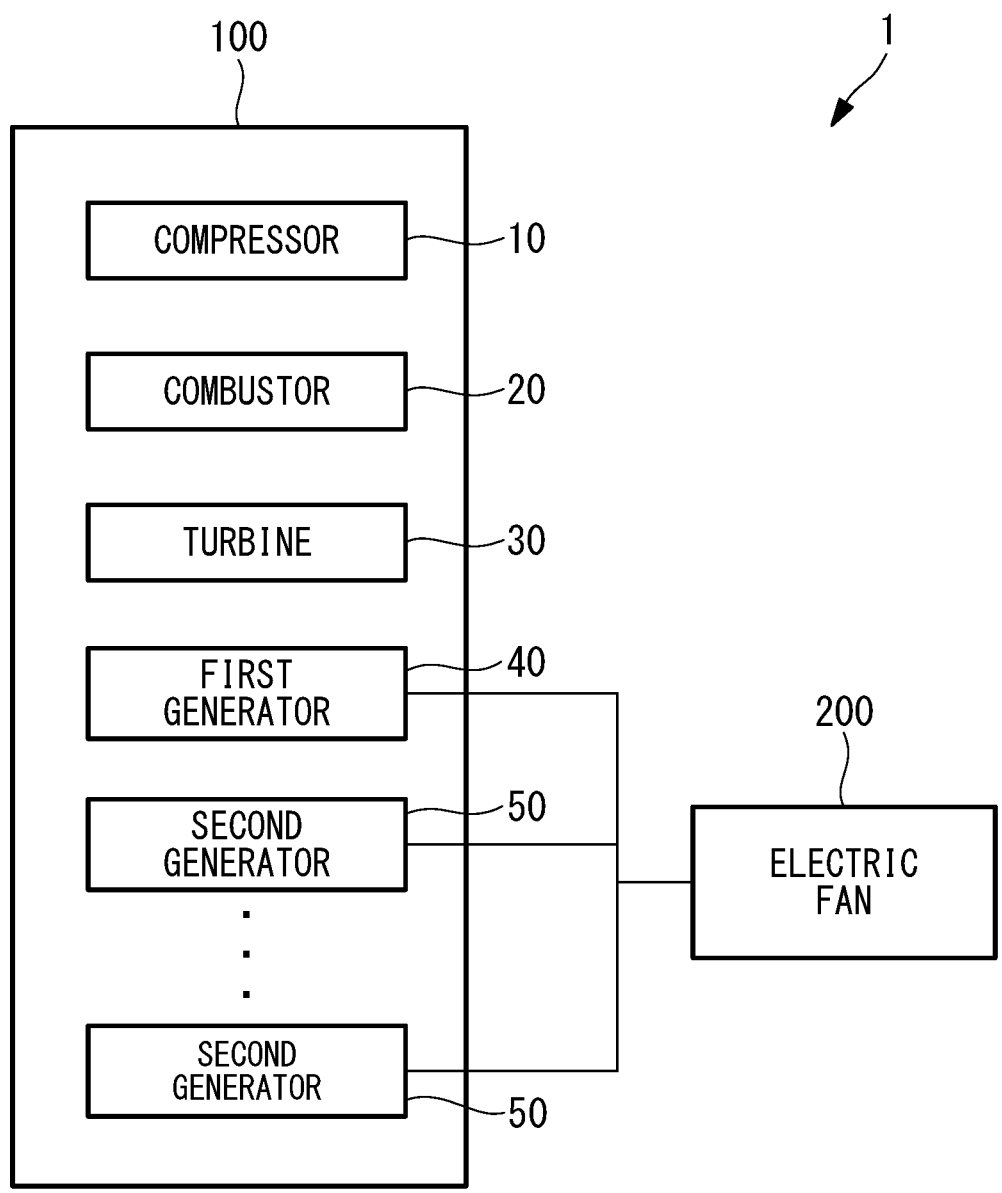
FIG. 1 is a schematic configuration diagram illustrating an aircraft according to a first embodiment of the present disclosure.
Figure 2:
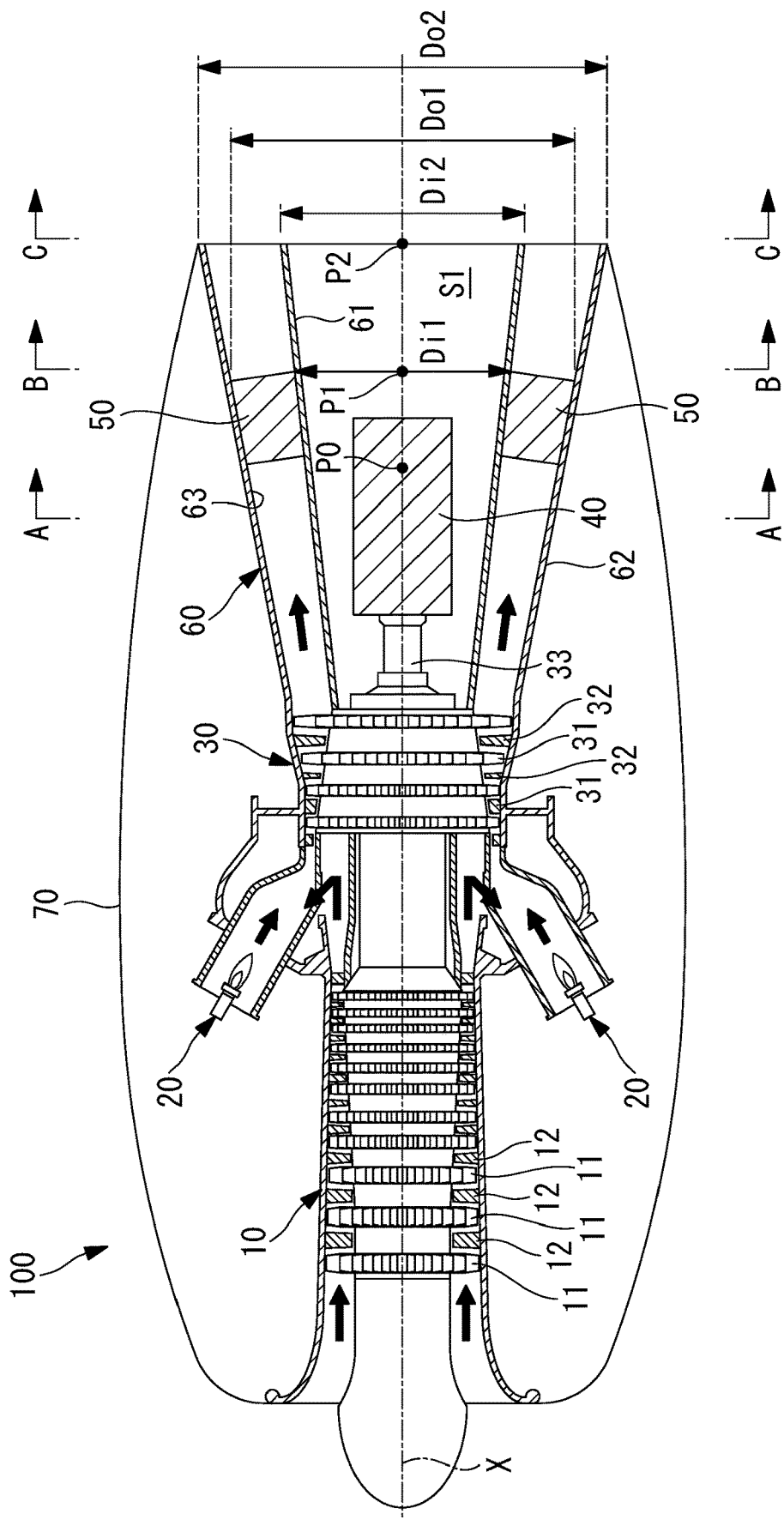
FIG. 2 is a longitudinal sectional view of a gas turbine system illustrated in FIG. 1.
Figure 3:
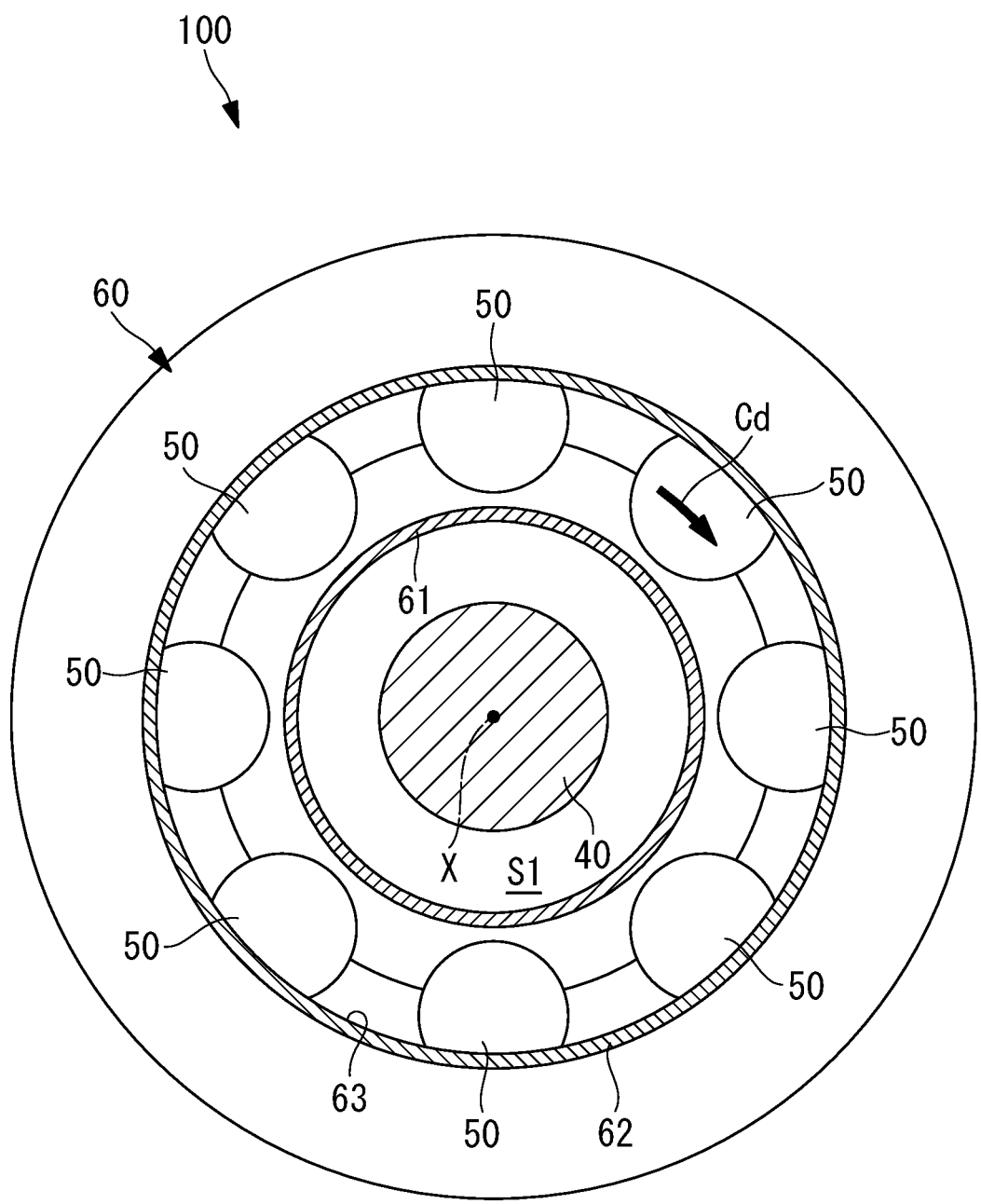
FIG. 3 is a sectional view taken along a line A-A of the gas turbine system illustrated in FIG. 2.
Figure 4:
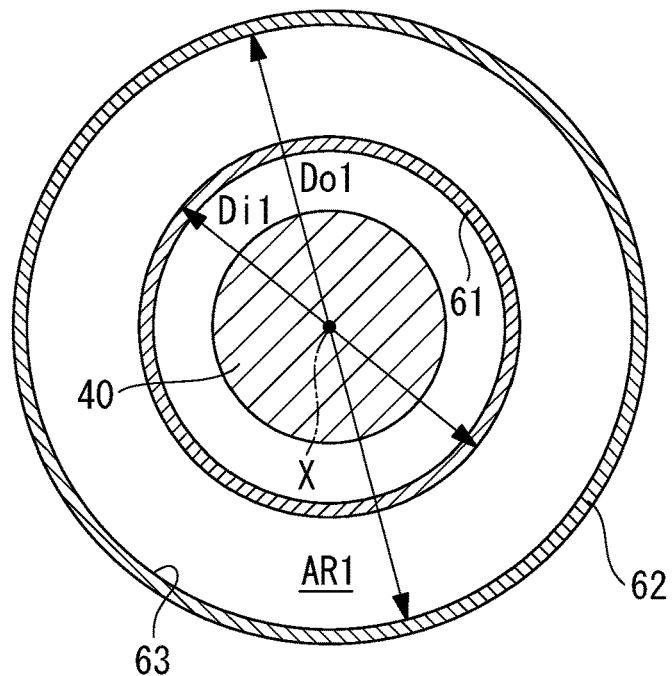
FIG. 4 is an end view taken along a line B-B of the gas turbine system illustrated in FIG. 2.
Figure 5:
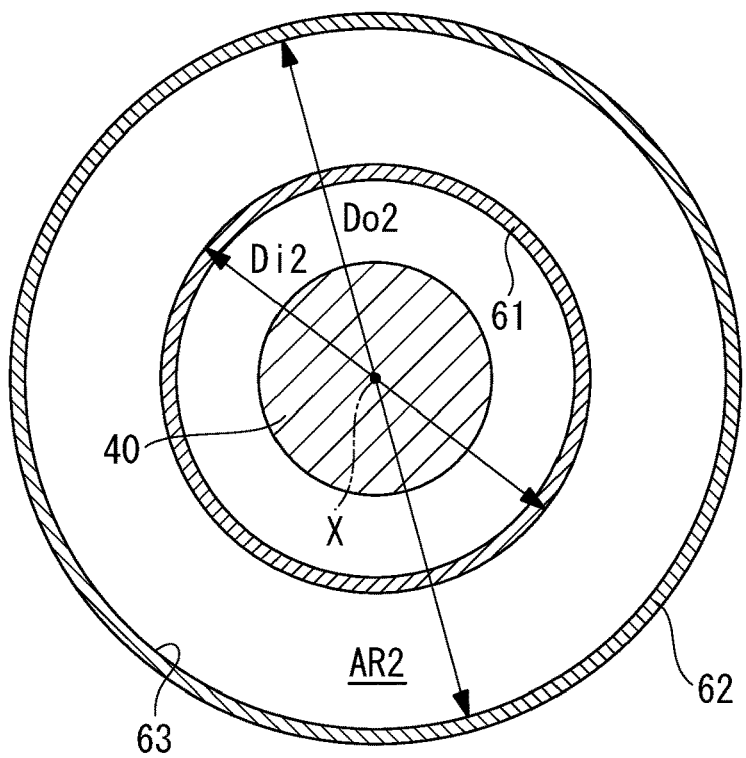
FIG. 5 is a sectional view taken along a line C-C of the gas turbine system illustrated in FIG. 2.

An aircraft (moving body) 1 according to a first embodiment of the present disclosure will be described below with reference to the drawings. FIG. 1 is a schematic configuration diagram illustrating the aircraft 1 according to the first embodiment of the present disclosure. FIG. 2 is a longitudinal sectional view of a gas turbine system 100 illustrated in FIG. 1. FIG. 3 is a sectional view taken along a line A-A of the gas turbine system 100 illustrated in FIG. 2. FIG. 4 is an end view taken along a line B-B of the gas turbine system 100 illustrated in FIG. 2. FIG. 5 is a sectional view taken along a line C-C of the gas turbine system 100 illustrated in FIG. 2.

As illustrated in FIG. 1, the aircraft 1 includes a gas turbine system 100 that generates electric power and an electric fan (thrust generator) 200 that generates thrust from electric power generated by the gas turbine system 100. The aircraft 1 of the present embodiment is an apparatus that drives the electric fan 200 to obtain thrust by using electric power generated by the gas turbine system 100.

As illustrated in FIG. 1 and FIG. 2, the gas turbine system 100 includes a compressor 10, combustors 20, a turbine 30, a first generator 40, a plurality of second generator 50, an exhaust unit 60, and a nacelle 70. As illustrated in FIG. 1, electric power generated by the first generator 40 and the second generators 50 is supplied to the electric fan 200.

The compressor 10 is a device that compresses external air flowing therein from the front in the traveling direction of the aircraft 1 to generate compressed air. The compressor 10 has a plurality of rotor blades 11 that rotate about an axis line X1 and a plurality of fixed stator blades 12 and generates compressed air by passing inflow air through the plurality of rotor blades 11 and the plurality of stator blades 12.

Each combustor 20 is a device that burns compressed air generated by the compressor 10 together with fuel to generate a high-temperature and high-pressure combustion gas. The combustor 20 rotates the turbine 30 about the axis line X1 by supplying a high-temperature and high-pressure combustion gas to the turbine 30. The combustors 20 are provided at a plurality of portions about the axis line X1.

The turbine 30 is a device driven by a combustion gas generated by the combustor 20. The turbine 30 has a plurality of rotor blades 31 that rotate about the axis line X, a plurality of fixed stator blades 32, and a drive shaft 33 coupled to the rotor blades. A combustion gas is passed through the plurality of rotor blades 31 and the plurality of stator blades 32, and thereby the rotor blades 31 rotate about the axis line X1. The driving force obtained by rotation of the rotor blades 31 is transmitted to the first generator 40 via the drive shaft 33.

The first generator 40 is a device that is coupled to the drive shaft 33 of the turbine 30 and generates electric power by driving force of the turbine 30. The first generator 40 has a rotor (not illustrated) that is coupled to the drive shaft 33 and rotates about the axis line X1 and a stator fixed and arranged around the rotor. As illustrated in FIG. 1, electric power generated by the first generator 40 is supplied to the electric fan 200.

Each second generator 50 is a device that generates electric power from a combustion gas that has passed through the turbine 30. For example, the second generator 50 is a device that converts kinetic energy of a combustion gas into power that rotates a rotating shaft of a small turbine, a windmill, and the like and drives a generator body (not illustrated) by using the converted power to generate electric power. Further, the second generator 50 is a device that converts thermal energy of a combustion gas into electric power based on the temperature difference between a high-temperature combustion gas and external air or the like, for example. Furthermore, the second generator 50 may be a device that converts kinetic energy of the combustion gas into electric power and converts thermal energy of a combustion gas into electric power. In such a way, the second generator 50 is a device that converts kinetic energy and/or thermal energy of a combustion gas that has passed through the turbine 30 into electric power.

The plurality of second generators 50 have generator bodies (not illustrated) that generate electric power, respectively, and supply the generated electric power to the electric fan 200. However, not all of the plurality of second generators 50 may have respective generator bodies (not illustrated), and a single generator body may be provided at the plurality of second generators 50. In such a case, the plurality of second generators 50 transmit the driving force to a single generator body by using an angle gearbox and the like and supply electric power to the electric fan 200 from the single generator body.

The electric fan 200 is a device that generates thrust from electric power generated by the first generator 40 and the second generator 50. The electric fan 200 can be installed at any position away from the gas turbine system 100 in the aircraft 1. The electric fan 200 rotates a fan (not illustrated) to obtain thrust.

As illustrated in FIG. 2, the exhaust unit 60 guides a combustion gas that has passed through the turbine 30 to outside. The exhaust unit 60 has an inner wall member 61 and an outer wall member 62. The inner wall member 61 extends along the axis line X, about which the turbine 30 rotates, and is formed in a cylindrical shape about the axis line X. The outer wall member 62 is formed in a cylindrical shape and extends along the axis line X and is arranged so as to surround the outer circumference side of the inner wall member 61.

As illustrated in FIG. 3, the inner wall member 61 and the outer wall member 62 form an annular channel 63 through which a combustion gas discharged from the turbine 30 flows and which extends along the axis line X. The annular channel 63 is a channel formed annularly about the axis line X and guides the entire amount of the combustion gas discharged from the turbine 30 to outside.

As illustrated in FIG. 2 and FIG. 3, an accommodation space S1 surrounded by the inner wall member 61 is formed on the inner circumference side of the inner wall member 61 with respect to the axis line X. The first generator 40 is arranged in the accommodation space S1. The first generator 40 is fixed to the inner wall member 61 via a fastener (not illustrated).

As illustrated in FIG. 2 and FIG. 3, the second generators 50 are arranged to a plurality of portions of the annular channel 63 at the same position along the axis line X. As illustrated in FIG. 3, the second generators 50 are arranged in a plurality of portions at regular intervals (8 portions at 45-degrees intervals in FIG. 3) along the circumferential direction Cd about the axis line X. By causing a combustion gas to flow inside, the second generator 50 converts kinetic energy and/or thermal energy of a combustion gas that has passed through the turbine 30 into electric power.

As illustrated in FIG. 2, the position P1 on the axis line X is a position corresponding to a downstream end portion of the second generator 50 in the flow direction of a combustion gas. The outer diameter of the inner wall member 61 at the position P1 is Di1. Further, the inner diameter of the outer wall member 62 at the position P1 is Do1. As illustrated in an end view of FIG. 4, the cross-sectional area of the annular channel 63 at the position P1 is AR1. The cross-sectional area AR1 is calculated by the following equation (1).

$$AR1 = \pi \cdot \{(Do1/2)^2 - (Di1/2)^2\} \quad (1)$$

As illustrated in FIG. 2, the position P2 on the axis line X is a position corresponding to a downstream end portion of the annular channel 63 in the flow direction of a combustion gas. The outer diameter of the inner wall member 61 at the position P2 is Di2. Further, the inner diameter of the outer wall member 62 at the position P2 is Do2. As illustrated in an end view of FIG. 5, the cross-sectional area of the annular channel 63 at the position P2 is AR2. The cross-sectional area AR2 is calculated by the following equation (2).

$$AR2 = \pi \cdot \{(Do2/2)^2 - (Di2/2)^2\} \quad (2)$$

Further, the cross-sectional area AR2 of the annular channel 63 at the position P2 is larger than the cross-sectional area AR1 of the annular channel 63 at the position P1. Furthermore, the annular channel 63 has a diffuser-like shape whose cross-sectional area gradually increases toward downstream in the flow direction of a combustion gas at each position ranging from the position P1 to the position P2.

A combustion gas discharged from the turbine 30 has a velocity component in the circumferential direction Cd along the rotation direction of the turbine 30. When the second generator 50 has higher energy recovery efficiency for a velocity component along the axis line X than for the velocity component along the circumferential direction Cd, it is preferable to convert a part of the velocity component in the circumferential direction Cd of a combustion gas into a velocity component along the axis line X. For example, when a small turbine that rotates about the axis line X or an axis line that is slightly inclined from the axis line X is used as the second generator 50, it is preferable to convert a part of the velocity component in the circumferential direction Cd of a combustion gas into the velocity component along the axis line X.

Figure 6:
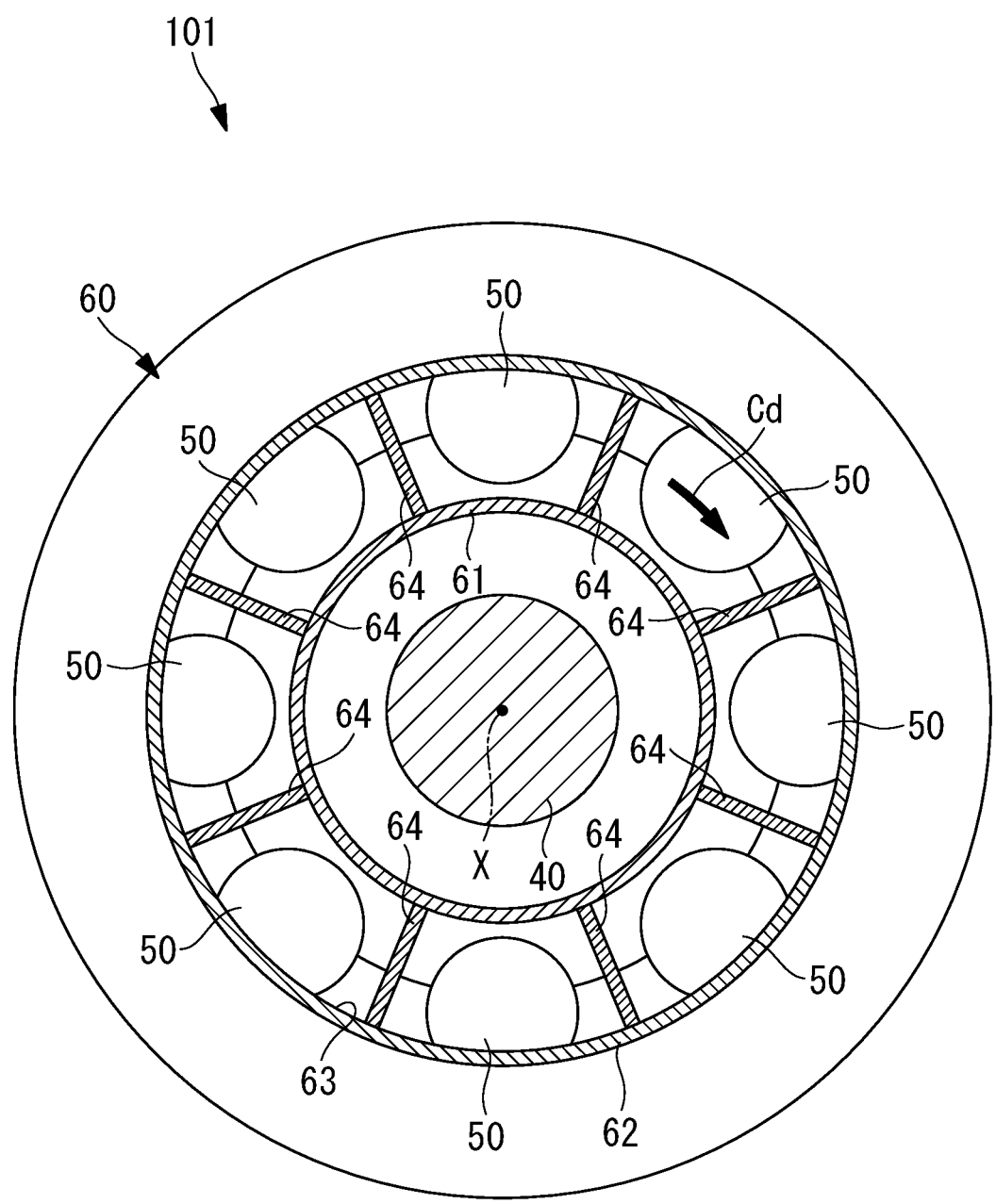
FIG. 6 is a sectional view taken along a line A-A of the modified example of the gas turbine system.

Accordingly, as with the gas turbine system 101 according to the modified example illustrated in FIG. 6, straightening vanes (straightening unit) 64 that connect the inner wall member 61 and the outer wall member 62 to each other may be arranged at a position upstream in the flow direction of the combustion gas at a plurality of portions in the circumferential direction Cd of the annular channel 63 from the position P0 in the annular channel 63. The straightening vanes 64 are plate-like members that extend orthogonally to (so as to intersect) the circumferential direction Cd and partition the annular channel 63 into a plurality of regions along the circumferential direction Cd. Herein, the position P0 corresponds to a position at which the end portion upstream of the second generator 50 is arranged in the axis line X direction. It is possible to supply a combustion gas straightened by the straightening vanes 64 to the second generator 50 by arranging the straightening vanes 64 upstream in the flow direction of the combustion gas of the position P0.

Since the straightening vanes 64 extend so as to intersect the circumferential direction Cd, a part of the velocity component in the circumferential direction Cd of the combustion gas is converted into the velocity component along the axis line X when the combustion gas collides with the straightening vanes 64. Accordingly, compared to a case where the straightening vanes 64 are not provided, it is possible to guide, to the second generator 50, the combustion gas having a reduced velocity component in the circumferential direction Cd and an increased velocity component along the axis line X.

The nacelle 70 is a shell arranged so as to cover respective components of the gas turbine system 100 including the compressor 10, the combustors 20, the turbine 30, and the exhaust unit 60. The nacelle 70 is formed in a cylindrical shape extending along the axis line X. The nacelle 70 is coupled to a fuselage (not illustrated) via a pylon (not illustrated).

The effects and advantages achieved by the aircraft 1 of the present embodiment described above will be described.

The aircraft 1 according to the present disclosure includes the compressor 10 that compresses external air to generate compressed air, the combustor 20 that burns the compressed air generated by the compressor 10 together with fuel to generate a combustion gas, the turbine 30 driven by the combustion gas generated by the combustor 20, the first generator 40 that is coupled to the turbine 30 and generates electric power by driving of the turbine 30, the electric fan 200 that generates thrust from electric power generated by the first generator 40, and the second generator 50 that is arranged downstream of the turbine 30 in the flow direction of a combustion gas and converts kinetic energy and/or thermal energy of a combustion gas that has passed through the turbine 30 into electric power.

According to the aircraft 1 of the present disclosure, the turbine 30 is driven by the combustion gas generated by the combustor 20, and the first generator 40 coupled to the turbine 30 generates electric power by the driving of the turbine 30. The electric fan 200 generates thrust by electric power generated by the first generator 40 and thus can impel the aircraft 1.

Further, kinetic energy and/or thermal energy of the combustion gas that has driven the turbine 30 are/is converted into electric power by the second generator 50 arranged downstream of the turbine 30 in the flow direction of the combustion gas. It is therefore possible to effectively utilize kinetic energy and/or thermal energy of a combustion gas used for the driving of the turbine 30 in the aircraft 1 including the first generator 40 and the second generator 50, which generate electric power by driving of the turbine 30, and the electric fan 200, which generates thrust from electric power.

The aircraft 1 according to the present disclosure includes the exhaust unit 60 that guides a combustion gas that has passed through the turbine 30 to the outside. The exhaust unit 60 has the inner wall member 61 formed in a cylindrical shape and extends along the axis line X, about which the turbine 30 rotates and the outer wall member 62 formed in a cylindrical shape and extending along the axis line X and arranged so as to surround the outer circumference side of the inner wall member 61. The inner wall member 61 and the outer wall member 62 form the annular channel 63 through which a combustion gas discharged from the turbine 30 flows and which extends along the axis line X. The first generator 40 is arranged in the accommodation space S1 formed on the inner circumference side of the inner wall member 61, and the second generator 50 is arranged in the annular channel 63.

According to the aircraft 1 of the present disclosure, since the first generator 40 is arranged in the accommodation space S1 formed on the inner circumference side of the inner wall member 61 provided to the exhaust unit 60, the first generator 40 can be arranged in a space through which no combustion gas flows. Further, since the second generator 50 is arranged in the annular channel 63 formed of the inner wall member 61 and the outer wall member 62 of the exhaust unit 60, a combustion gas discharged from the turbine 30 can be reliably guided to the second generator 50.

In the aircraft 1 according to the present disclosure, the annular channel 63 has a diffuser-like shape whose cross-sectional area gradually increases from the position at which the second generator 50 is arranged toward downstream in the flow direction of a combustion gas.

Since the annular channel 63 has a diffuser-like shape, the velocity of a combustion gas flow is slowed down and the pressure thereof increases when the combustion gas that has passed through the second generator 50 is discharged to the outside, and it is thus possible to improve the overall efficiency of the turbine 30. Note that it is desirable to form the shapes of the inner wall member 61 and the outer wall member 62 so as to suppress separation of the combustion gas flow therefrom for suppressing a separation phenomenon due to an increase in pressure of the combustion gas.

In the aircraft 1 according to the present disclosure, the second generators 50 are arranged to a plurality of portions in the circumferential direction about the axis line X of the annular channel 63.

Since the second generators 50 are arranged to a plurality of portions in the circumferential direction of the annular channel 63, kinetic energy and/or thermal energy of a combustion gas that has passed through the turbine 30 can be converted into electric power in each of the plurality of second generators 50.

Second Embodiment

Next, an aircraft according to a second embodiment of the present disclosure will be described. The present embodiment is a modified example of the first embodiment and is assumed to be the same as the first embodiment unless particularly described below, and the description thereof will be omitted below.

The gas turbine system 100 included in the aircraft of the first embodiment has the plurality of second generators 50 arranged in the annular channel 63 formed between the inner wall member 61 and the outer wall member 62. In contrast, a gas turbine system 100A included in the aircraft of the present embodiment has the plurality of second generators 50 arranged in a plurality of separation channels 65Aa, respectively, to which a combustion gas flowing into the annular channel 63A is distributed.

Figure 7:
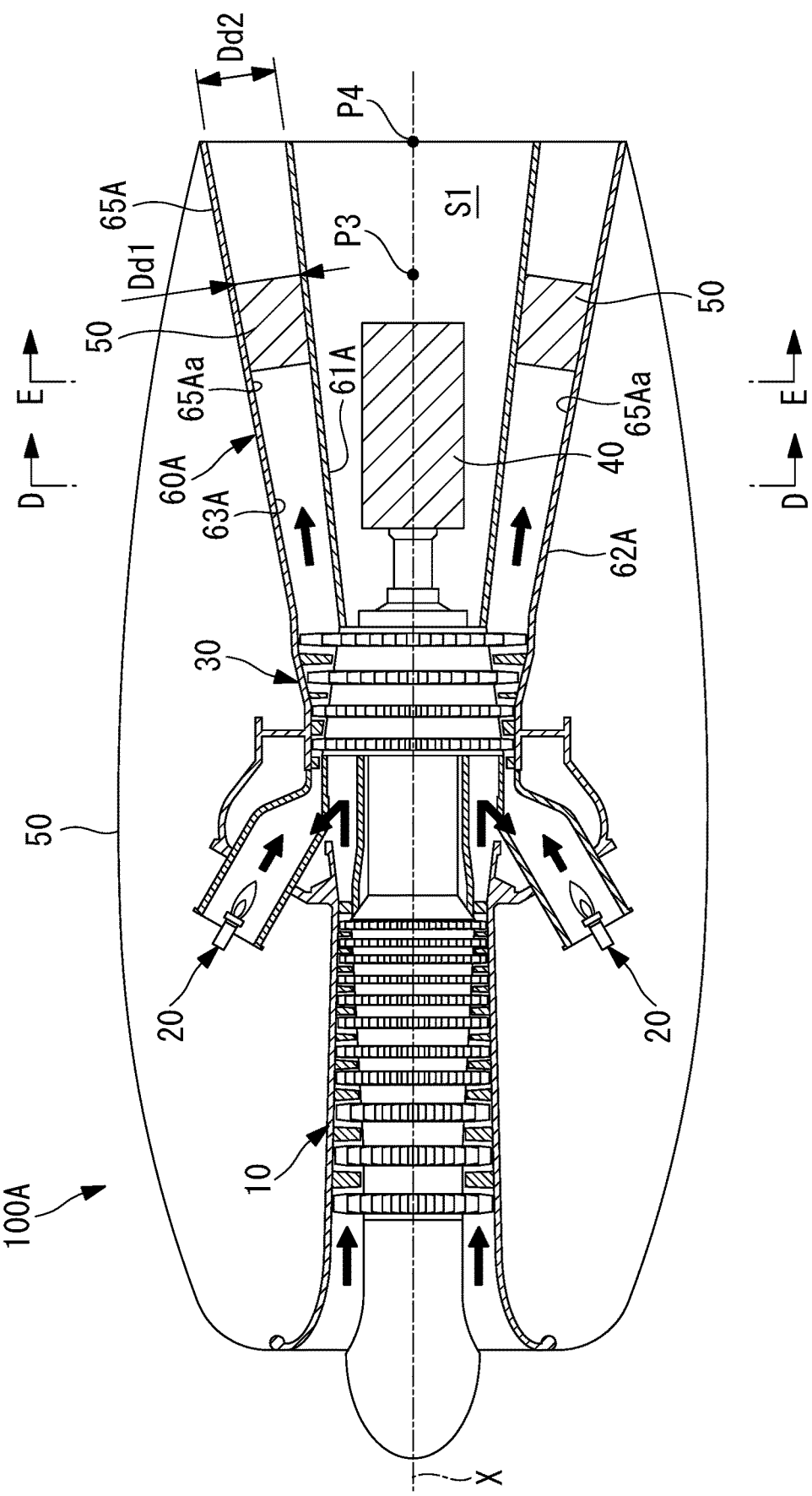
FIG. 7 is a longitudinal sectional view of a gas turbine system according to a second embodiment of the present disclosure.
Figure 8:
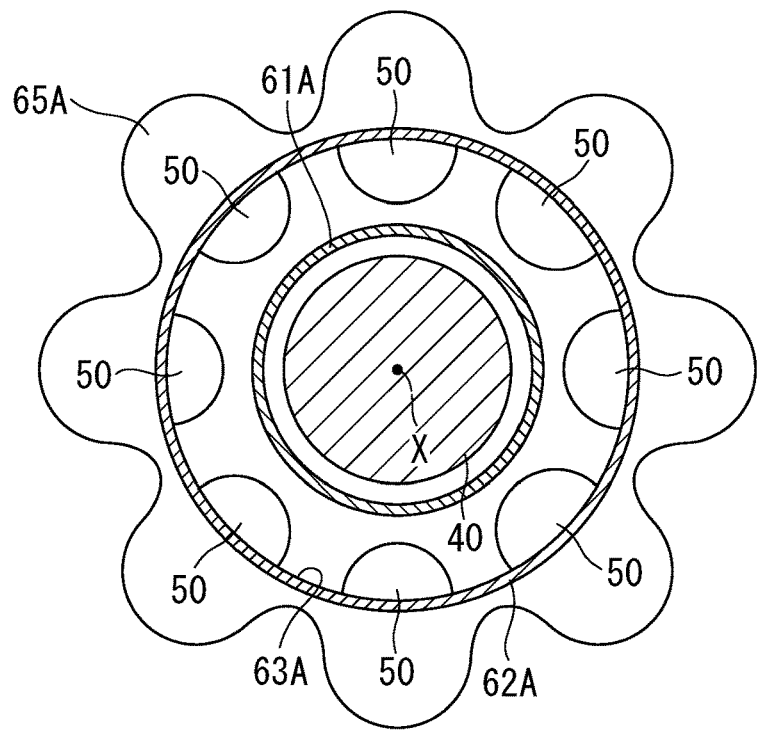
FIG. 8 is a sectional view taken along a line D-D of the gas turbine system illustrated in FIG. 7.
Figure 9:
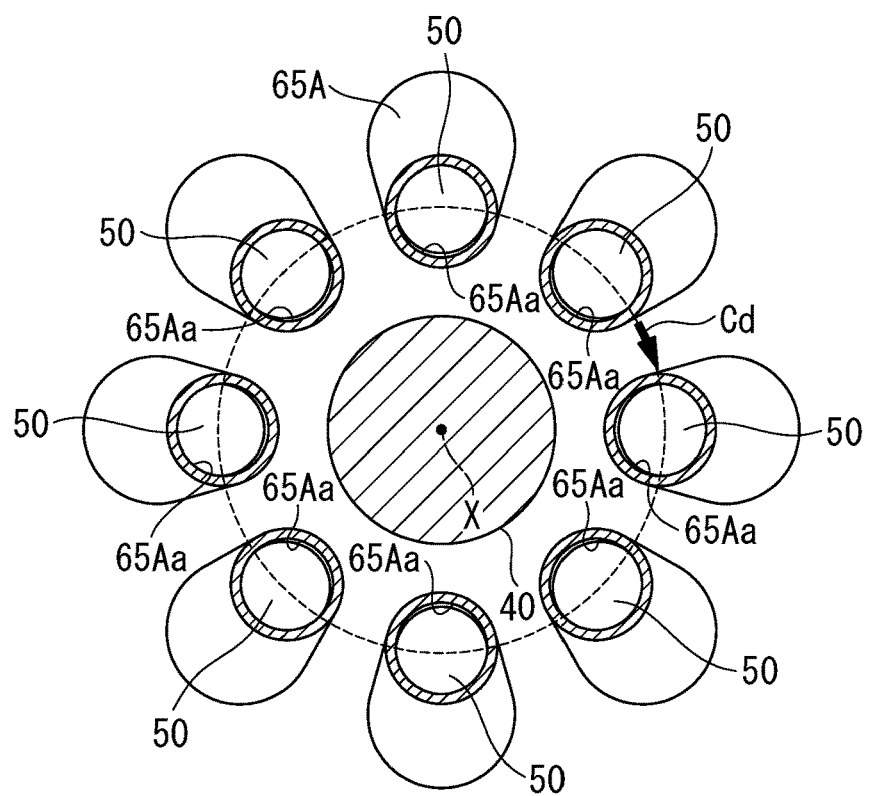
FIG. 9 is a sectional view taken along a line E-E of the gas turbine system illustrated in FIG. 7.

The aircraft (moving body) according to the second embodiment of the present disclosure will be described below with reference to the drawings. FIG. 7 is a longitudinal sectional view of the gas turbine system 100A according to the present embodiment. FIG. 8 is a sectional view taken along the arrow D-D of the gas turbine system 100A illustrated in FIG. 7. FIG. 9 is a sectional view taken along the arrow E-E of the gas turbine system 100A illustrated in FIG. 7.

Although an exhaust unit 60A of the present embodiment and the exhaust unit 60 of the first embodiment are the same in that both guide a combustion gas that has passed through the turbine 30 to the outside, specific structures thereof are different from each other. The exhaust unit 60A of the present embodiment will be described below. The exhaust unit 60A of the present embodiment includes an inner wall member 61A, an outer wall member 62A, and a distribution unit 65A.

As illustrated in FIG. 8, the inner wall member 61A and the outer wall member 62A form the annular channel 63A through which a combustion gas discharged from the turbine 30 flows and which extends along the axis line X. The annular channel 63A is a channel formed annularly about the axis line X and guides the entire amount of the combustion gas discharged from the turbine 30 to the outside. The combustion gas flowing into the annular channel 63A is discharged via the distribution unit 65A to the outside.

The distribution unit 65A is a member that distributes a combustion gas flowing into the annular channel 63A to a plurality of separation channels 65Aa arranged in a plurality of portions in the circumferential direction Cd about the axis line X. The distribution unit 65A has a three-dimensional shape that distributes the entire amount of the combustion gas, which passes through the annular channel 63A into the plurality of separation channels 65Aa substantially evenly toward downstream in the flow direction. The entire amount of the combustion gas flowing into the distribution unit 65A from the annular channel 63A is distributed to the plurality of separation channels 65Aa and is discharged via each of the plurality of separation channels 65Aa to the outside.

FIG. 9 is a sectional view taken along the arrow E-E of the gas turbine system 100A illustrated in FIG. 7 and illustrates a cross section of the plurality of separation channels 65Aa.

As illustrated in FIG. 9, the plurality of separation channels 65Aa are channels formed in a round shape in a cross-sectional view, respectively, and are arranged discretely to be spaced at intervals along the circumferential direction Cd about the axis line X (8 portions at 45-degrees intervals in FIG. 9). Since the entire amount of the combustion gas flowing through the annular channel 63A is guided to the plurality of separation channels 65Aa, no combustion gas is guided from the annular channel 63A to the accommodation space S1 in which the first generator 40 is arranged.

As illustrated in FIG. 7 to FIG. 9, the second generators 50 of the present embodiment are arranged in the plurality of separation channels 65Aa, respectively, at the same position along the axis line X. As illustrated in FIG. 8 and FIG. 9, the second generators 50 are arranged in a plurality of portions at regular intervals (8 portions at 45-degrees intervals in FIG. 8 and FIG. 9) along the circumferential direction Cd about the axis line X. By causing a combustion gas to flow inside, the second generator 50 converts kinetic energy and/or thermal energy of a combustion gas that has passed through the turbine 30 into electric power.

As illustrated in FIG. 8 and FIG. 9, a value obtained by summing up the cross-sectional areas of the plurality of separation channels 65Aa is sufficiently smaller than the cross-sectional area of the annular channel 63A. Therefore, the flow velocity of a combustion gas guided from the annular channel 63A to the plurality of separation channels 65Aa increases and the combustion gas flows into the second generator 50 in a state where the kinetic energy thereof increases. Therefore, energy recovery efficiency from the combustion gas by the second generator 50 increases compared to the first embodiment in which a part of the combustion gas does not pass through the second generator 50.

As illustrated in FIG. 7, the position P3 on the axis line X is a position corresponding to a downstream end portion of the second generator 50 in the flow direction of a combustion gas. The inner diameter of the separation channel 65Aa at the position P3 is Dd1. The position P4 on the axis line X is a position corresponding to a downstream end portion of the separation channel 65Aa in the flow direction of a combustion gas. The inner diameter of the separation channel 65Aa at the position P4 is Dd2.

Further, the inner diameter Dd2 of the separation channel 65Aa at the position P4 is larger than the inner diameter Dd1 of the separation channel 65Aa at the position P3. Furthermore, the separation channel 65Aa has a diffuser-like shape whose cross-sectional area gradually increases toward downstream in the flow direction of a combustion gas at each position from the position P3 to the position P4.

The effects and advantages achieved by the moving body of the present embodiment described above will be described.

The aircraft 1 according to the present disclosure includes the exhaust unit 60A that guides a combustion gas that has passed through the turbine 30 to the outside, the exhaust unit 60A has the inner wall member 61A formed in a cylindrical shape and extending along an axis line X about which the turbine 30 rotates and the outer wall member 62A formed in a cylindrical shape and extending along the axis line X and arranged so as to surround the outer circumference side of the inner wall member 61A, and the inner wall member 61A and the outer wall member 62A cause a combustion gas discharged from the turbine 30 to flow and form the annular channel 63A about the axis line X, and the gas turbine system further includes the distribution unit 65A that distributes a combustion gas flowing into the annular channel 63A to a plurality of separation channels 65Aa arranged in a plurality of portions in the circumferential direction about the axis line X, the first generator 40 is arranged in the accommodation space S1 formed on the inner circumference side of the inner wall member 61A, and the second generators 50 are arranged in the plurality of separation channels 65Aa, respectively.

According to the aircraft 1 of the present disclosure, since the first generator 40 is arranged in the accommodation space S1 formed on the inner circumference side of the inner wall member 61, the first generator 40 can be arranged in a space through which no combustion gas flows. A combustion gas discharged from the turbine 30 flows into the annular channel 63A formed of the inner wall member 61A and the outer wall member 62A and is distributed to the plurality of separation channels 65Aa arranged at a plurality of portions in the circumferential direction, respectively, by the distribution unit 65A. Since the second generators 50 are arranged in the plurality of separation channels 65Aa, respectively, the entire amount of the combustion gas discharged from the turbine 30 can be reliably guided to the second generator 50.

In the aircraft 1 according to the present disclosure, the separation channel 65Aa has a diffuser-like shape whose cross-sectional area gradually increases from the position at which the second generator 50 is arranged toward downstream in the flow direction of a combustion gas.

Since the separation channel 65Aa has a diffuser-like shape, the velocity of a combustion gas flow is slowed down and the pressure thereof increases when the combustion gas that has passed through the second generator 50 is discharged to the outside, and it is thus possible to improve the overall efficiency of the turbine 30. Note that it is desirable to form a wall face shape of the separation channel 65Aa so as to suppress separation of the combustion gas flow from the wall face for suppressing a separation phenomenon due to an increase in pressure of the combustion gas.

Other Embodiments

Although the annular channel 63 of the first embodiment has a diffuser-like shape whose cross-sectional area gradually increases from the position at which the second generator 50 is arranged toward downstream in the flow direction of a combustion gas, other forms may be employed. For example, the annular channel 63 may be a channel whose cross-sectional area does not change from the position at which the second generator 50 is arranged toward downstream in the flow direction of a combustion gas.

Although the separation channel 65Aa of the second embodiment has a diffuser-like shape whose cross-sectional area gradually increases from the position at which the second generator 50 is arranged toward downstream in the flow direction of a combustion gas, other forms may be employed. For example, the separation channel 65Aa may be a channel whose cross-sectional area does not change from the position at which the second generator 50 is arranged toward downstream in the flow direction of a combustion gas.

The gas turbine system of each embodiment described above is understood as follows, for example.

A gas turbine system (100) according to the present disclosure is used for a moving body (1) including a thrust generator (200) configured to generate thrust from electric power and includes: a compressor (10) that compresses external air to generate compressed air; a combustor (20) that burns the compressed air generated by the compressor (10) together with fuel to generate a combustion gas; a turbine (30) driven by the combustion gas generated by the combustor (20); a first generator (40) that is coupled to the turbine (30) to generate electric power by driving of the turbine (30) and supplies electric power to the thrust generator (200); and a second generator (50) that is arranged downstream of the turbine (30) in a flow direction of a combustion gas and converts kinetic energy and/or thermal energy of a combustion gas that has passed through the turbine into electric power. The thrust generator (200) is an electric fan (200), for example. The moving body (1) is an aircraft that obtains thrust from the electric fan (200), for example.

According to the gas turbine system (100) of the present disclosure, the turbine (30) is driven by the combustion gas generated by the combustor (20), and the first generator (40) coupled to the turbine (30) generates electric power by the driving of the turbine (30). Since the thrust generator (200) generates thrust from electric power generated by the first generator (40), it is possible to impel the moving body (1). Further, kinetic energy and/or thermal energy of the combustion gas that has driven the turbine (30) are/is converted into electric power by the second generator (50) arranged downstream of the turbine (30) in the flow direction of the combustion gas. It is therefore possible to effectively utilize kinetic energy and/or thermal energy of a combustion gas used for the driving of the turbine (30) in the moving body (1) including the generators (40, 50) that generate electric power by the driving of the turbine (30) and the thrust generator (200) that generates thrust from electric power.

The gas turbine system (100) according to the present disclosure includes an exhaust unit (60) that guides a combustion gas that has passed through the turbine (30) to outside, the exhaust unit (60) has an inner wall member (61) formed in a cylindrical shape and extending along an axis line (X) about which the turbine (30) rotates and an outer wall member (62) formed in a cylindrical shape and extending along the axis line (X) and arranged so as to surround the outer circumference side of the inner wall member (61), the inner wall member (61) and the outer wall member (62) form an annular channel (63) through which a combustion gas discharged from the turbine (30) flows and which extends along the axis line (X), the first generator (40) is arranged in an accommodation space (S1) formed on the inner circumference side of the inner wall member (61), and the second generator (50) is arranged in the annular channel (63).

According to the gas turbine system (100) of the present disclosure, since the first generator (40) is arranged in the accommodation space (S1) formed on the inner circumference side of the inner wall member (61) provided to the exhaust unit (60), the first generator (40) can be arranged in a space through which no combustion gas flows. Further, since the second generator (50) is arranged in the annular channel (63) formed of the inner wall member (61) and the outer wall member (62) of the exhaust unit (60), a combustion gas discharged from the turbine (30) can be reliably guided to the second generator (50).

In the gas turbine system (100) according to the present disclosure, the annular channel (63) has a diffuser-like shape whose cross-sectional area gradually increases from the position at which the second generator (50) is arranged toward downstream in the flow direction of a combustion gas.

Since the annular channel (63) has a diffuser-like shape, the velocity of a combustion gas flow is slowed down and the pressure thereof increases when the combustion gas that has passed through the second generator (50) is discharged to the outside, and it is thus possible to improve the overall efficiency of the turbine (30).

In the gas turbine system (100) according to the present disclosure, the second generators (50) are arranged to a plurality of portions in the circumferential direction about the axis line (X) of the annular channel (63).

Since the second generators (50) are arranged in a plurality of portions in the circumferential direction of the annular channel (63), kinetic energy and/or thermal energy of a combustion gas that has passed through the turbine (30) can be converted into electric power in each of the plurality of second generators (50).

The gas turbine system (100) according to the present disclosure includes straightening units (64) arranged in a plurality of portions in a circumferential direction about the axis line (X) of the annular channel (63) and arranged upstream in a flow direction of a combustion gas of the second generator (50), and the straightening unit (64) is a plate-like member that connects the inner wall member (61) and the outer wall member (62) to each other and extends so as to intersect the circumferential direction.

According to the gas turbine system (100) of the present disclosure, the plurality of straightening units (64) are arranged in the annular channel (63) upstream in the flow direction of the combustion gas of the second generator (50). Since the straightening unit (64) is a plate-like member that connects the inner wall member (61) and the outer wall member (62) to each other and extends so as to intersect the circumferential direction, a part of the velocity component in the circumferential direction (Cd) of the combustion gas is converted into the velocity component along the axis line (X) when the combustion gas collides with the straightening units (64). Accordingly, compared to a case where the straightening unit (64) is not provided, it is possible to guide, to the second generator (50), the combustion gas having a reduced velocity component in the circumferential direction (Cd) and an increased velocity component along the axis line (X).

The gas turbine system (100) according to the present disclosure includes an exhaust unit (60A) that guides a combustion gas that has passed through the turbine (30) to outside, the exhaust unit (60A) has an inner wall member (61A) formed in a cylindrical shape and extending along an axis line (X) about which the turbine (30) rotates and an outer wall member (62A) formed in a cylindrical shape and extending along the axis line (X) and arranged so as to surround the outer circumference side of the inner wall member (61A), and the inner wall member (61A) and the outer wall member (62A) cause a combustion gas discharged from the turbine (30) to flow and form an annular channel (63A) about the axis line (X), and the gas turbine system includes a distribution unit (65A) that distributes a combustion gas flowing into the annular channel (63A) to a plurality of separation channels (65Aa) arranged in a plurality of portions in the circumferential direction about the axis line (X), the first generator (40) is arranged in an accommodation space (S1) formed on the inner circumference side of the inner wall member (61A), and the second generator (50) is arranged in each of the plurality of separation channels (65Aa).

According to the gas turbine system (100) of the present disclosure, since the first generator (40) is arranged in the accommodation space (S1) formed on the inner circumference side of the inner wall member (61), the first generator (40) can be arranged in a space through which no combustion gas flows. A combustion gas discharged from the turbine (30) flows into the annular channel (63A) formed of the inner wall member (61A) and the outer wall member (62A) and is distributed, by the distribution unit (65A), to each of the plurality of separation channels (65Aa) arranged in a plurality of portions in the circumferential direction. Since the second generators (50) are arranged in the plurality of separation channels (65Aa), respectively, the entire amount of the combustion gas discharged from the turbine (30) can be reliably guided to the plurality of second generators (50).

In the gas turbine system (100) according to the present disclosure, the separation channel (65Aa) has a diffuser-like shape whose cross-sectional area gradually increases from the position at which the second generator (50) is arranged toward downstream in the flow direction of a combustion gas.

Since the separation channel (65Aa) has a diffuser-like shape, the velocity of a combustion gas flow is slowed down and the pressure thereof increases when the combustion gas that has passed through the second generator (50) is discharged to the outside, and it is thus possible to improve the overall efficiency of the turbine (30).

The moving body of the present embodiment described above is understood as follows, for example.

A moving body (1) according to the present disclosure includes: the gas turbine system (100) according to any one of the above; and a thrust generator (200) that generates thrust from electric power generated by the gas turbine system (100).

According to the present disclosure, in the gas turbine system (100) used for the moving body (1) including the generator (40) that generates electric power by driving of the turbine (30) and the thrust generator (200) that generates thrust from electric power, kinetic energy and/or thermal energy of a combustion gas used for the driving of the turbine (30) can be effectively utilized.

REFERENCE SIGNS LIST 1 aircraft (moving body)
10 compressor
20 combustor
30 turbine
31 moving vane
40 first generator
50 second generator
60, 60A exhaust unit
61, 61A inner wall member
62, 62A outer wall member
63, 63A annular channel
64 straightening vanes (straightening unit)
65A distribution unit
65Aa separation channel
70 nacelle
100, 100A, 101 gas turbine system
200 electric fan (thrust generator)
AR1, AR2 cross-sectional area
Cd circumferential direction
S1 accommodation space
X axis line

The invention claimed is:
1. A gas turbine system used for a moving body comprising a thrust generator configured to generate thrust from electric power, the gas turbine system comprising:
 a compressor that compresses external air to generate a compressed air;

a combustor that burns the compressed air generated by the compressor together with fuel to generate a combustion gas;

a turbine driven by the combustion gas generated by the combustor;

a first generator that is coupled to the turbine to generate electric power by driving of the turbine and supplies electric power to the thrust generator;

at least one second generator that is arranged downstream of the turbine in a flow direction of the combustion gas and converts kinetic energy and/or thermal energy of the combustion gas that passed through the turbine into electric power; and an exhaust unit that guides the combustion gas that passed through the turbine to outside, wherein the exhaust unit has an inner wall member formed in a cylindrical shape and extending along an axis line about which the turbine rotates and an outer wall member formed in a cylindrical shape and extending along the axis line and arranged so as to surround an outer circumference side of the inner wall member, and wherein the inner wall member and the outer wall member cause the combustion gas discharged from the turbine to flow and form an annular channel about the axis line, and the gas turbine system further comprising a distribution unit that distributes the combustion gas flowing into the annular channel to a plurality of separation channels arranged in a plurality of portions in a circumferential direction about the axis line, wherein the first generator is arranged in an accommodation space formed on an inner circumference side of the inner wall member, and wherein the second generator is arranged in each of the plurality of separation channels.

2. The gas turbine system according to claim 1, wherein each of the separation channels has a diffuser-like shape whose cross-sectional area gradually increases toward downstream in the flow direction of the combustion gas from a position at which the second generator is arranged.

3. A moving body comprising:
the gas turbine system according to claim 1; and
a thrust generator that generates thrust from electric power generated by the gas turbine system.

* * * * *